United States Patent [19]
Mercer

[11] 3,916,147
[45] Oct. 28, 1975

[54] APPARATUS FOR ELECTRICALLY HEATING AND INSERTING A REPAIR WIRE

[76] Inventor: William E. Mercer, 3121 Hopewell Place, Toledo, Ohio 43606

[22] Filed: Mar. 25, 1974

[21] Appl. No.: 454,409

Related U.S. Application Data

[62] Division of Ser. No. 348,023, April 5, 1973, Pat. No. 3,820,221.

[52] U.S. Cl. .................. 219/234; 30/140; 83/171; 219/233; 219/240; 219/533; 264/249
[51] Int. Cl.² .......................................... H05B 1/00
[58] Field of Search .......... 219/230, 233, 234, 235, 219/240, 533; 264/249; 128/303.14; 83/170, 171; 30/140

[56] References Cited
UNITED STATES PATENTS

| | | | |
|---|---|---|---|
| 2,213,898 | 9/1940 | Brook | 219/233 X |
| 2,465,722 | 3/1949 | Hamilton | 219/234 UX |
| 2,476,612 | 7/1949 | Lobdell | 219/233 X |
| 2,513,431 | 7/1950 | Sell | 219/50 X |
| 2,715,670 | 8/1955 | Dicke | 219/235 |
| 2,734,986 | 2/1956 | Gameros | 219/235 X |
| 3,390,252 | 6/1968 | Storck | 219/234 |

FOREIGN PATENTS OR APPLICATIONS

| | | | |
|---|---|---|---|
| 832,358 | 6/1938 | France | 128/303.14 |

*Primary Examiner*—A. Bartis
*Attorney, Agent, or Firm*—Allen D. Gutchess, Jr.

[57] ABSTRACT

An apparatus for repairing plastic eyeglass frames for use in a repair process wherein a U-shaped repair wire is electrically heated and then pressed into the frame across a break to become embedded therein. The apparatus includes a handpiece from which a pair of electrically conducitive friction grips extend. The forward end of each of the friction grips has spaced wire engaging means to receive the legs of the repair wire in electrically conductive engagement. The wire engaging means of each friction grip includes a flange extending transversely of the grip and having an opening to receive the leg of the wire and a rearwardly extending flange adapted to frictionally engage the portion of the wire extending through and beyond the opening in the flange. A transformer is connected in circuit with the grips with the power controlled by a switch in the hand piece.

3 Claims, 5 Drawing Figures

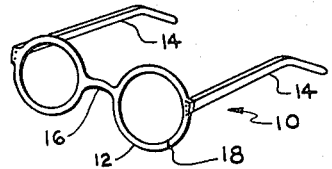
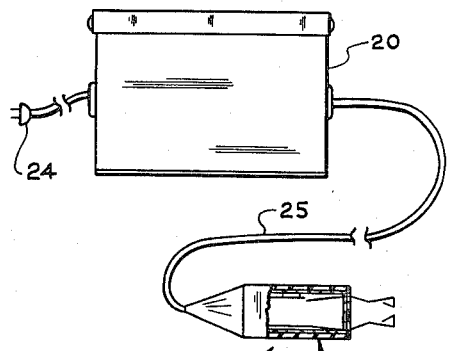
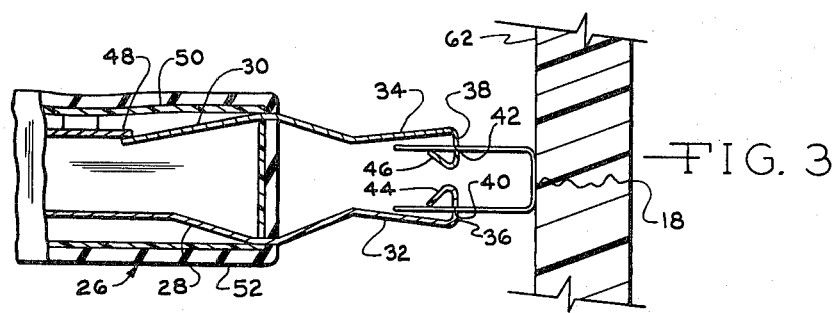
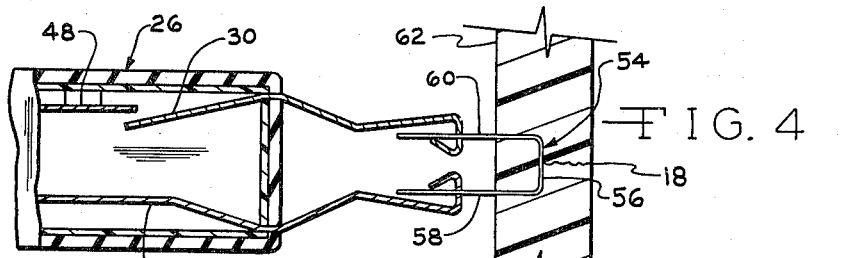
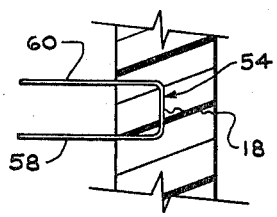
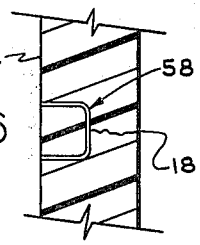

APPARATUS FOR ELECTRICALLY HEATING AND INSERTING A REPAIR WIRE

This is a division of application Ser. No. 348,023 filed on Apr. 5, 1973, now U.S. Pat. No. 3,820,221.

This invention relates to a method and apparatus for repairing heat-softenable material and particularly eye glass frames.

The invention is especially adaptable for the repair of plastic eye glass frames. Heretofore, no suitable way has been known to repair eye glass frames. When a frame is broken, it is simply replaced, which is both expensive and time consuming. The wearer may be without glasses or with an extremely makeshift and tenuous repair for several days until the new frame or part thereof is received. In the case of a workman, the damage may even result in his being off the job for a period of time. For example, if a machinist should break his eye glass frame, he may be unable to work for a considerable period of time, until a replacement can be obtained. This results in lost wages, time, or labor.

The present invention provides a method and apparatus for inexpensively and quickly repairing an eye glass frame. According to the method, a wire of a given length is first formed into a generally U-shaped configuration having a web portion and two leg portions. The wire is then heated to a temperature above the temperature required to soften the plastic material of which the eye glass frame is made. The web portion of the wire is then pressed into the frame across the discontinuity formed by the crack or break, at which time the wire becomes embedded in the frame as the material is softened. When the wire is embedded to the desired extent, it is allowed to cool, and after the plastic material hardens, the leg portions of the wire projecting from the frame can be removed to complete the repair.

The apparatus according to the invention includes a hand piece, preferably of a non heat-conducting material, from which extend two friction grips. A power source is connected through the hand piece to the grips with the power preferably controlled by a switch carried by the hand piece. The wire with which the repair is to be made is bent to a generally U-shaped configuration with the leg portions thereof then received in the friction grips. When the switch is closed, the wire is heated to a temperature above the temperature at which the frame becomes heat softenable. The wire is then manipulated by the hand piece with the web portion pressed into the plastic material across the discontinuity, with the web portion embedded in the plastic below the surface thereof. The switch is then opened and the wire allowed to cool. After the material hardens, the hand piece is merely moved away from the eye glass frame to pull the friction grips off the leg portions of the wire. At this time, the projecting leg portions are cut off and can be filed smooth with the surface of the frame, if desired.

The entire repair can be accomplished within a few minutes. Further, the apparatus employed is relatively inexpensive. Consequently, the repair kit can even be obtained for nurse stations, such as those in industrial plants, where repairs can be made quickly and with a minimum amount of lost time. The embedded wire also provides an extremely strong joint since not only does the heat-softened plastic material on both sides of the discontinuity tend to join together, but the wire acts as a reinforcement.

It is, therefore, a principal object of the invention to provide an improved method and apparatus for repairing eye glass frames.

Another object of the invention is to provide a method and apparatus for repairing heat-softenable material.

A further object of the invention is to provide a method of repairing discontinuities in heat-softenable material by heating a wire, pressing the wire across the discontinuity, and trimming the end portions of the wire after it is cooled.

Yet another object of the invention is to provide apparatus for quickly and easily repairing heat-softenable material which is inexpensive.

Yet a further object of the invention is to provide a stronger repaired joint in heat-softenable material.

Other objects and advantages of the invention will be apparent from the following detailed description of a preferred embodiment thereof, reference being made to the accompanying drawings, in which:

FIG. 1 is a view in perspective of a damaged eye glass frame made of plastic material;

FIG. 2 is a fragmentary side view in elevation, with parts broken away and with parts in section, of apparatus embodying the invention;

FIG. 3 is a fragmentary, enlarged view in cross section of a tool shown in FIG. 2 having a wire engaged therewith, and ready to initiate repair of the eye glass frame;

FIG. 4 is a view similar to FIG. 3, but with the wire having been heated and embedded in the plastic material;

FIG. 5 is a view in section of the frame and wire of FIG. 4, with the tool removed; and FIG. 6 is a view similar to FIG. 5 but with the ends or leg portions of the wire cut off.

Referring particularly to FIG. 1, an eye glass frame is indicated at 10 and includes a lens frame 12 and stems 14. All parts of the frame, including the stems 14, the lens frame 12, and a nose piece 16 are subject to being broken, with a discontinuity indicated at 18, constituting a crack or break, being shown in the lens frame 12. If the break is sufficiently severe so as to render the glasses unwearable, the wearer might have to exist without any glasses for several days while replacements are obtained. A workman whose eyesight is essential to his job might incur substantial lost wages or the employer might lose considerable time or money because of such damage.

The method and apparatus according to the invention, however, enable the discontinuity 18 in the eye glass frame 10 to be repaired quickly and easily, and with inexpensive equipment. The method can be practiced with minimum skill requirements and the apparatus is sufficiently inexpensive that any industrial nursing station can have the equipment as well as optometrists, ophthalmologists, opticians, etc.

Referring particularly to FIG. 2, the apparatus according to the invention basically includes a transformer 20 and a tool 22. The transformer 20 has a 110 volt primary coil which can be connected with line current through a plug 24. The transformer also has a 6.3 volt, 3 amp. secondary coil which is connected to the tool 22 through a pair of conductors 25. The conductors 25 extend into a hand piece 26 of the tool 22 where they are electrically connected to metal strips 28 and 30 (FIG. 3) which extend out of the hand piece 26 and form friction grips 32 and 34. The grips 32 and 34 have inwardly extending flanges 36 and 38 with openings 40 and 42 therein, with the inwardly extending flanges terminating in rearwardly extending flanges 44 and 46.

The hand piece 26 preferably carries a switch for controlling current to the friction grips 32 and 34. As shown, a switch 48 is mounted within the hand piece adjacent an inner flexible casing 50 thereof so that when the casing 50 is depressed at the appropriate area, the switch 48 will close. As shown, an external sheath 52 is also located around the casing 50.

To effect repair of the frame 10, a wire indicated at 54 is first bent into a generally U-shaped configuration, including a web portion 56 and leg portions 58 and 60. In a preferred form, the wires, which can be in the order of 1½ inches long, are supplied in straight form with the equipment. The wire can then be bent to the desired U-shaped configuration by a suitable tool, such as needle-nose pliers. With this arrangement, the shape of the wire can be controlled to fit a particular discontinuity more readily than if all wires were preformed into a standard configuration.

After the wire is formed, the leg portions 58 and 60 are inserted in the openings 40 and 42 of the inwardly extending flanges 36 and 38. The leg portions also bear against the edges of the rearwardly extending flanges 44 and 46 which thereby aid in holding the wire 54 in frictional engagement with the grips 32 and 34.

When the wire is held in the grips, the switch 48 can be closed to connect the wire through the grips 32 and 34 with the power source. The wire is almost instantaneously heated to a temperature above that required to soften the heat-softenable material of which the frame 10 is made. Preferably, the wire is heated to the point of being visibly red so that its condition is readily apparent to the operator of the equipment. The extent of the heating can be closely controlled by the operator through the opening and closing of the switch 48. With the wire heated to the extent desired, it is then pressed against a surface indicated at 62 across the discontinuity 18 in the form of the crack or break. Some pressure is placed on the wire 54 through manipulation of the hand piece 26 to cause the web portion 56 of the wire to become embedded in the plastic material, approximately as shown in FIG. 4. The heat-softened material tends to flow together behind the U-shaped portion 56 of the wire 54 to obliterate the discontinuity 18 at that portion and join the material together. At the same time, the web portion 56 and parts of the leg portions 58 and 60 of the wire become firmly embedded in the plastic material and simultaneously act as a reinforcing member across the discontinuity.

After the wire is embedded in the plastic material, the switch 48 is opened by relieving the pressure on the side of the hand piece 26 and the wire is allowed to cool, which also occurs almost instantaneously. The hand piece 26 is then simply withdrawn from the frame 10 and the surface 62 thereof, leaving the wire 54 embedded in the frame with the leg portions 58 and 60 extending outwardly therefrom, as shown in FIG. 5. Subsequently, the leg portions 58 and 60 can be snipped off close to the surface 62 to complete the repair, although the remaining projecting ends of the leg portions 58 and 60 can be filed down smooth with the surface 62 if desired.

The wire 54 can be embedded in the lower surface of the lens frame 12 or in the front surface thereof, depending upon the style of the frame and the type of damage. In some instances, as when a break occurs in the nose piece 10, two of the repair wires can be employed, one from above and one from below.

It will be seen from the above that the method and apparatus according to the invention enable heat-softenable bodies and especially eye glass frames to be repaired quickly, easily, and inexpensively. The eye glasses are immediately useable and can either be worn until a replacement is obtained, or permanently. If the repair is done with care and suitably finished, the repair will often be satisfactory without replacement of the frame or a portion thereof.

Various modifications of the above described embodiment of the invention will be apparent to those skilled in the art and it is to be understood that such modifications can be made without departing from the scope of the invention, if they are within the spirit and the tenor of the accompanying claims.

I claim:

1. Apparatus for heating and inserting a repair wire having a web and two legs extending in a common direction from the web into a heat-softenable plastic body in the process of repairing a discontinuity in the form of a break or crack in the heat-softenable plastic body, said apparatus comprising a hand piece, two electrically conductive friction grips extending forwardly from said hand piece, the forward ends of said grips forming spaced, wire-engaging means to receive in electrically conductive engagement the legs of the wire, the wire-engaging means of each of said friction grips having a flange extending transversely of the respective friction grip and having an opening therein to receive a leg of the repair wire, each of said flanges having its extremity bent to form a rearwardly extending flange adapted to frictionally engage the portion of the wire leg extending through and beyond the opening in the respective transversely extending flange, power supply means, conductor means extending through said hand piece and connecting said friction grips with said power supply means, and a switch associated with said conductor means for controlling the supply of power to said friction grips.

2. Apparatus according to claim 1 characterized by said switch being a manual pressure-responsive switch carried by said hand piece.

3. Apparatus for heating and inserting a repair wire having a web and two legs extending in a common direction from said web into a heat-softenable plastic body in the process of repairing a discontinuity in the form of a break or crack in the heat-softenable plastic body, said apparatus comprising a transformer, a hand piece having an outer surface of a nonheatconducting material, two electrically conductive friction grips extending forwardly from the front end of said hand piece, the forward ends of said friction grips having spaced, wire-engaging means to receive the legs of the repair wire in electrically conductive engagement, said wire-engaging means of each of said friction grips having a flange extending transversely of the respective friction grip and having an opening therein to receive a leg of the repair wire, each of said flanges having a rearwardly extending flange adapted to frictionally engage the portion of the wire leg extending through and beyond the opening in the respective transversely extending flange, conductor means connecting said friction grips with the output of said transformer, and a switch carried by said hand piece and connected with said conductor means for controlling the power to said friction grips.

* * * * *